United States Patent [19]

Mouri et al.

[11] Patent Number: 5,273,242
[45] Date of Patent: Dec. 28, 1993

[54] POWERED SEAT SLIDE DEVICE

[75] Inventors: Takayuki Mouri; Masanori Terai; Tohru Isomura; Harufumi Terasawa, all of Kanagawa, Japan

[73] Assignee: Ikeda Bussan Co., Ltd., Ayase, Japan

[21] Appl. No.: 928,286

[22] Filed: Aug. 12, 1992

[30] Foreign Application Priority Data

Aug. 28, 1991 [JP] Japan .................. 3-68709[U]

[51] Int. Cl.$^5$ .............................................. B60N 1/08
[52] U.S. Cl. .................................................. 248/429
[58] Field of Search ............... 248/429, 430, 424, 420; 296/65.1; 74/89.15

[56] References Cited

U.S. PATENT DOCUMENTS

| | | | |
|---|---|---|---|
| 3,374,347 | 3/1968 | Hirose | 248/276 X |
| 4,150,872 | 9/1992 | Isomura | 74/89.15 X |
| 4,703,972 | 11/1987 | Omberg | 248/276 X |
| 4,721,337 | 1/1988 | Tomita | 248/429 X |
| 4,915,340 | 4/1990 | Nawa et al. | 248/429 |
| 5,170,975 | 12/1992 | Chadwick | 248/284 |

Primary Examiner—Ramon O. Ramirez
Attorney, Agent, or Firm—Foley & Lardner

[57] ABSTRACT

A powered seat slide device including at least one pair of guide rails for slidably supporting a seat such that the position of the seat relative to a floor is adjusted frontwardly and rearwardly, comprises a drive motor causing a relative sliding movement of one of the guide rails to the other, through a driving mechanism employing a gear box fixed to the one of the rails to serve as a reduction gear transmitting rotation torque from the motor to a screw-threaded shaft which is fixed onto the one of rails and engaged with a nut member rigidly mounted on the other rail for rotation relative to the screw-threaded shaft, while reducing a motor speed and increasing torque created by the motor, a motor mounting bracket formed integral with the gear box, for directly connecting the motor to the gear box, and an opening provided in the side wall of the one of rails, for avoiding the interference between the motor assembly and the guide rails.

7 Claims, 7 Drawing Sheets

POWERED SEAT SLIDE DEVICE

BACKGROUND OF THE INVENTION

1. Field of the Invention

The present invention relates to a powered seat slide device, such as a motor-driven seat slide device for an automotive vehicle, and specifically to a powered seat slide device employing at least one pair of guide rails, namely an upper slidable guide rail firmly secured to the bottom surface of the automobile seat and a lower stationary guide rail rigidly mounted on the floor panel of the vehicle body, which is capable of electrically adjusting the position of the automobile seat assembly in a direction generally parallel to the longitudinal direction of the vehicle body.

2. Description of the Prior Art

A conventional automotive powered seat slide device employs a telescopically extendable guide rail structure for each side of the seat assembly. The telescopically extendable guide rail structure is usually interposed between the seat cushion and the floor panel of the vehicle.

Figure 1:
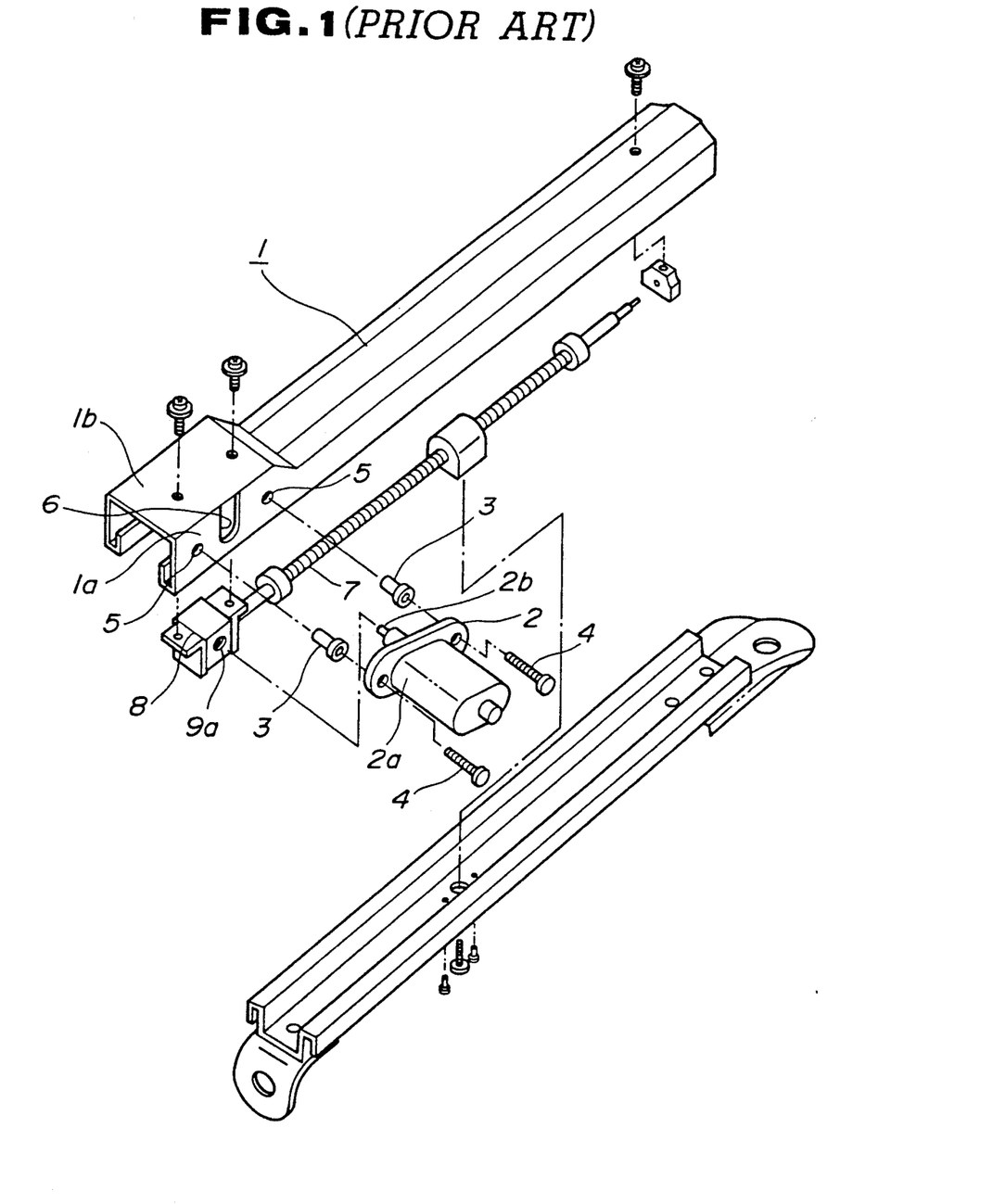
FIG. 1 is an exploded perspective view illustrating an installation structure of a conventional powered seat slide device.
Figure 2:
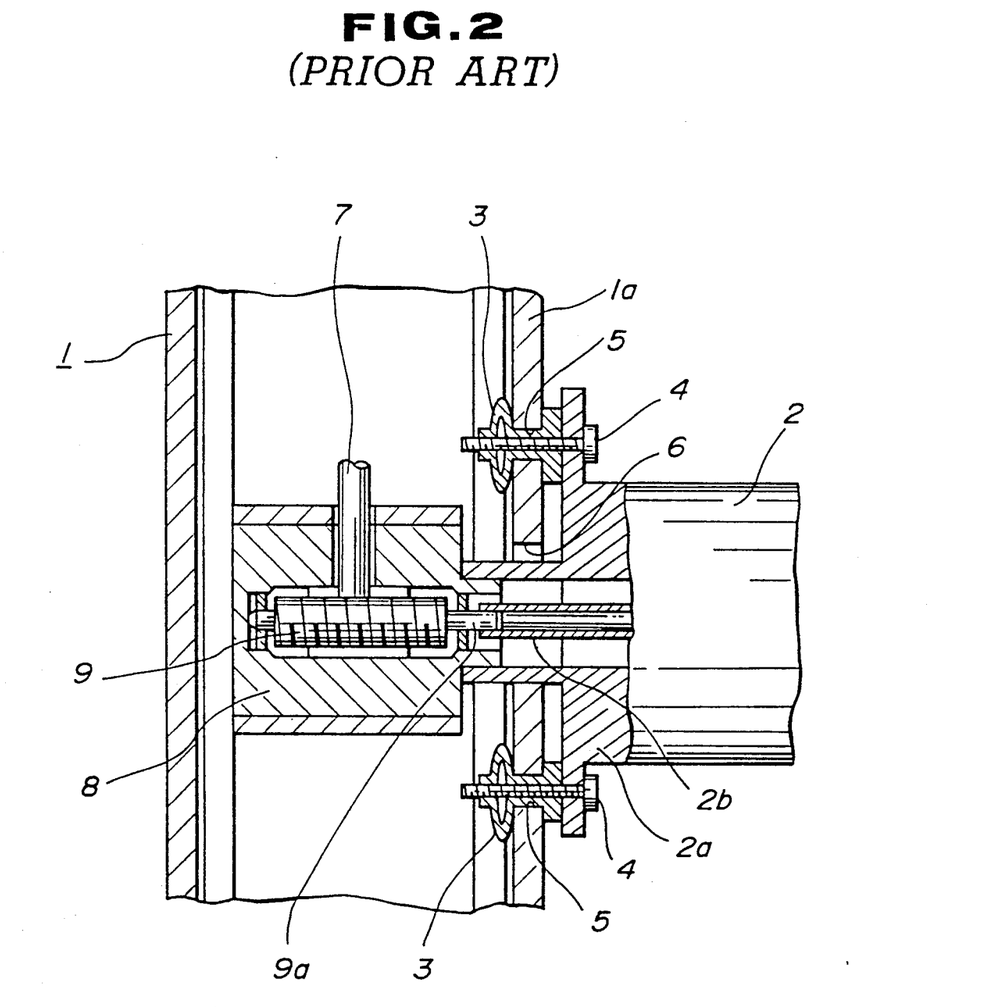
FIG. 2 is a holizontal cross-sectional view illustrating a mounting arrangement of the drive motor relative to the slidable guide rail employed in the conventional powered seat slide device.

Referring now to FIGS. 1 and 2, there is shown a conventional powered seat slide device for automotive vehicles. The telescopically extendable guide rail structure is comprised of an upper slidable guide rail 1 firmly secured to a respective side portion of the base plate of the seat and a lower stationary guide rail rigidly mounted on the floor panel. The powered seat slide device also includes a guide rail driving mechanism being comprised of a drive motor 2, such as a DC motor, and a gear box 8 including a worm 9 having a driven connection with a drive shaft 2b of the motor and a worm wheel having external threads meshed with the worm 9. As seen in FIG. 2, the drive motor 2 is firmly secured to the side wall section 1a of the upper slidable guide rail 1 by means of fasteners, for example a fastening bolt 4 utilized with a well-type self-locking nut 3, a board anchor, a blind rivet or the like. Reference numeral 5 designates a circular opening 5 for directly fitting the nut 3. The gear box 8 serves as a reduction gear for reducing revolution of the output shaft 2b of the motor 2 and increasing rotation torque created therethrough. The worm wheel is rigidly formed integral with a screw-threaded shaft 7 rotatably supported by the upper guide rail 1 through bearings at both ends thereof. Reference numeral 6 is a cut-out 6 formed at the inner side wall section 1a of the upper slidable guide rail 1, for introducing a cylindrical hub section formed integral with the a main motor casing 2a of the motor 2 thereinto. The output shaft 2b of the motor is rotatably supported by the above noted cylindrical hub section of the motor and outwardly extended The output shaft 2b has a driving connection with an input shaft 9a of the worm 9. Generally, the output shaft 2b is directly connected to the input shaft 9a as shown in FIG. 2. Alternatively, the output shaft 2b could be connected through a rigid coupling to the input shaft 9a, as disclosed in Japanese Patent First Publication Tokkai (Showa) 63-34252. In order to insure smooth torque transmission from the output shaft 2b of the motor to the input shaft 9a of the worm, the two shafts 2b and 9a are precisely aligned with each other.

In the previously noted conventional powered seat slide devices, the two shafts 2b and 9a can be precisely aligned with each other only under a particular condition wherein the plane defined by the ceiling wall section 1b of the upper slidable guide rail 1 is precisely formed perpendicularly to the plane defined by the side wall section 1a through a precise machining, such as a bending process with an extremely high machining accuracy. Supposing that the machining accuracy in the bending process is less than a predetermined criterion, the angle sandwiched between the side wall section 1a and the ceiling wall section 1b is offset from a right angle (90°). Thus, the two shafts 9a and 2b could be misaligned with each other. As a result, smooth and high torque transmission is prevented and consequently noise occurs at the connecting portion between the two shafts 9a and 2b, when the machining accuracy in the upper guide rail 1 is low. Furthermore, since the drive motor 2 is directly connected to the side wall section 1a of the upper guide rail 1 having a relatively low rigidity, the guide rail 1 experiences resonance through the direct connection with the upper guide rail 1, because the guide rail 1 must receive reaction force created due to moment of inertia of the rotor enclosed in the motor 2, during rotation of the motor. Under this condition, a noise level generated during operation of the driving mechanism is increased with great energy loss and as a result an exciting current value of the motor 2 is also increased, since the drive motor is susceptible to such resonance. As appreciated from the above, the motor employed in the conventional powered seat slide device has an increased tendency to become overloaded due to the above resonance created between the motor 2 and the upper guide rail 1 or the driving mechanism including the screw-threaded member 7 and the gear box 8. This results in a relatively low durability of the device. Furthermore, since the main motor casing 2a is directly connected to the side wall section 1a of the upper guide rail 1, but not to gear box 8, the alignment matching between the two shafts 2b and 9a is determined only by an installation accuracy in a relative position of the main motor casing 2a to the upper guide rail 1. Assuming that the installation accuracy is low, the previously noted resonance may occur between the motor and the driving mechanism, thereby resulting in a low rotation torque transmission efficiency.

SUMMARY OF THE INVENTION

It is, therefore, in view of the above disadvantages, an object of the present invention to provide a powered seat slide device employing at least one telescopically extendable guide rail unit, a drive motor and a gear box, which can provide a smooth and high torque transmission from the output shaft of the drive motor to an input shaft of the gear box, irrespective of a machining accuracy in either one guide rail of the rail unit for rigidly mounting the gear box thereon, or an installation accuracy in a relative position of the motor body to the above one guide rail.

It is another object of the invention to provide a powered seat slide device employing a drive motor, a gear box, and a pair of guide rails being comprised of an upper slidable guide rail and a lower stationary guide rail, which can reliably prevent the motor from being overloaded during operation of the device, while avoiding resonance created between the motor and a driving mechanism for causing a sliding movement of the slidable guide rail relative to the stationary guide rail.

It is a further object of the invention to provide a powered seat slide device which can provide a high durability of the device.

In order to accomplish the aforementioned and other objects, a powered seat slide device including at least one pair of guide rails for slidably supporting a seat such that the position of the seat relative to a floor is adjusted frontwardly and rearwardly, comprises a driving mechanism having a driven connection with a drive motor, for causing a relative sliding movement of one of the guide rails to the other, the driving mechanism including a screw-threaded member rotatably supported on either one of the guide rails, a nut member engaged with the screw-threaded member and rigidly mounted on the other of the rails for rotation relative to the screw-threaded member, and a gear box fixed to the one of the rails to serve as a reduction gear transmitting rotation torque from the motor to the screw-threaded member, while reducing a motor speed and increasing the torque created by the motor, a motor mounting member formed integral with the gear box, for directly connecting the motor to the gear box, and an opening provided in the side wall of the one of the rails, for avoiding the interference between the motor assembly and the one of the guide rails. The motor mounting member includes a pair of brackets formed integral with the gear box in such a manner as to extend in the longitudinal direction of the one of the rails, the brackets are symmetrically arranged with each other in respect to an axis of input shaft of the gear box.

According to another aspect of the invention, a powered seat slide device including at least one pair of guide rails for slidably supporting a seat such that the position of the seat relative to a floor is adjusted frontwardly and rearwardly, comprises a driving mechanism having a driven connection with a drive motor, for causing a relative sliding movement of one of the guide rails to the other, the driving mechanism including a screw-threaded member rotatably supported on either one of the guide rails, a nut member engaged with the screw-threaded member and rigidly mounted on the other of the rails for rotation relative to the screw-threaded member, and a gear box fixed to the one of the rails to serve as a reduction gear transmitting rotation torque from the motor to the screw-threaded member, while reducing a motor speed and increasing the torque created by the motor, a motor mounting bracket formed integral with the gear box, for directly connecting the motor to the gear box, a motor mounting flange formed integral with a motor casing of the motor, for rigidly mounting the motor on the motor mounting bracket, the motor mounting flange including at least two axially extending cylindrical hollow legs through which the motor is secured onto the motor mounting bracket, the cylindrical hollow legs are symmetrically arranged with each other in respect to the axis of the output shaft of the motor, and an opening provided in the side wall of the one of the rails, for avoiding the interference between the motor assembly and the one of the guide rails. The gear box has a higher rigidity than the one of the rails. The gear box may include a first cylindrical hub section coaxially arranged with the axis of the input shaft of the gear box, while rotatably enclosing the input shaft of the gear box, and the motor mounting flange may include a second cylindrical hub section coaxially arranged with the axis of the output shaft of the motor, while rotatably enclosing the output shaft of the motor. The outer periphery of the first cylindrical hub section is press-fitted into the inner periphery of the second cylindrical hub section, so as to assure a rigid connection between the motor assembly and the gear box.

DESCRIPTION OF THE PREFERRED EMBODIMENTS

Figure 7:
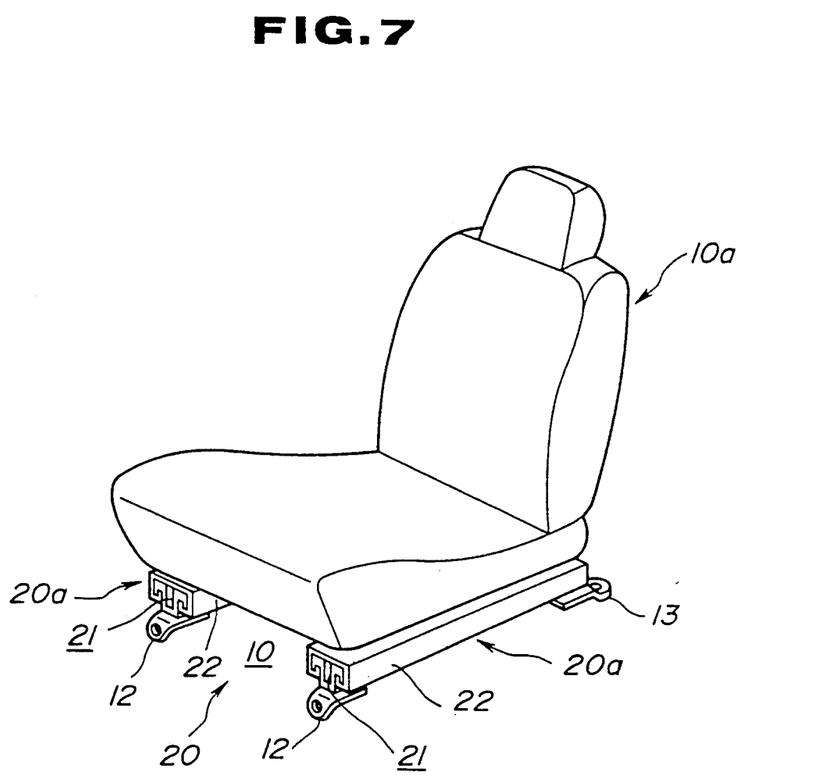
FIG. 7 is a schematic perspective view illustrating a seat assembly employing a powered seat slide device of the embodiment of FIGS. 3 through 6.

Referring now to the drawings, particularly to FIG. 7, there is shown an automobile powered seat slide device 20 through which a relative position of an automobile seat 10a to the floor panel 10 of the vehicle body is electrically adjustable. The powered seat slide device 20 comprises a pair of telescopically extendable guide rail units 20a respectively provided on both sides of the bottom surface of the seat 10a and in addition extending frontwardly and rearwardly of the seat. Each guide rail unit 20a is comprised of a lower stationary guide rail 21 rigidly mounted on the floor panel 10 of the vehicle body by means of fastening bolts and an upper slidable guide rail 22 firmly secured onto the side portion of the bottom surface of the seat by means of fasteners, such as fastening bolts, rivets or the like, in a manner so as to reliably support the seat and also slidable in relation to the lower stationary guide rail 21. As seen in FIG. 7, each guide rail unit 20a is secured through front and rear brackets 12 and 13 onto the floor panel 10 of the vehicle body.

Figure 3:
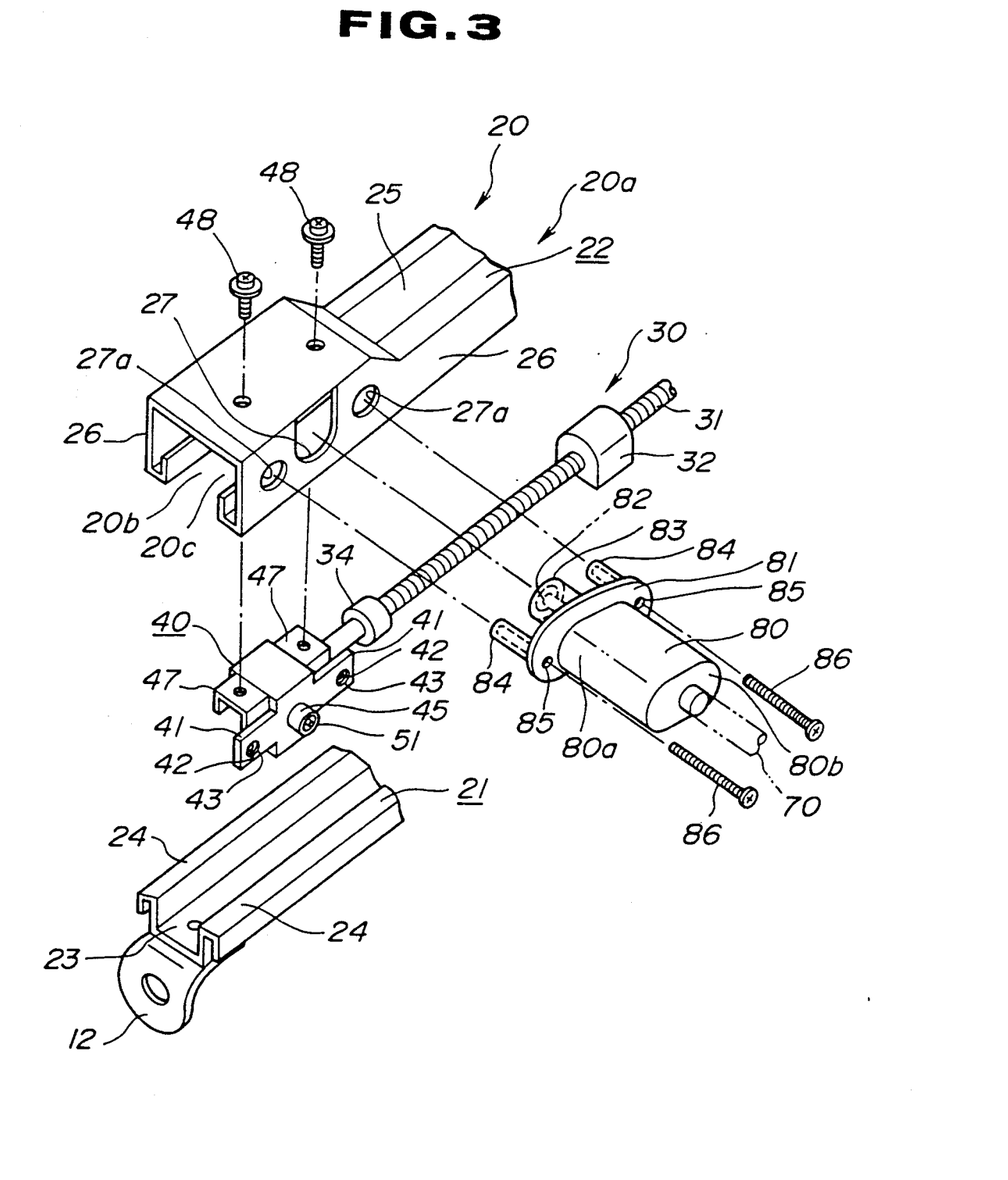
FIG. 3 is an exploded perspective view illustrating an essential portion of one embodiment of the powered seat slide device according to the invention.
Figure 4:
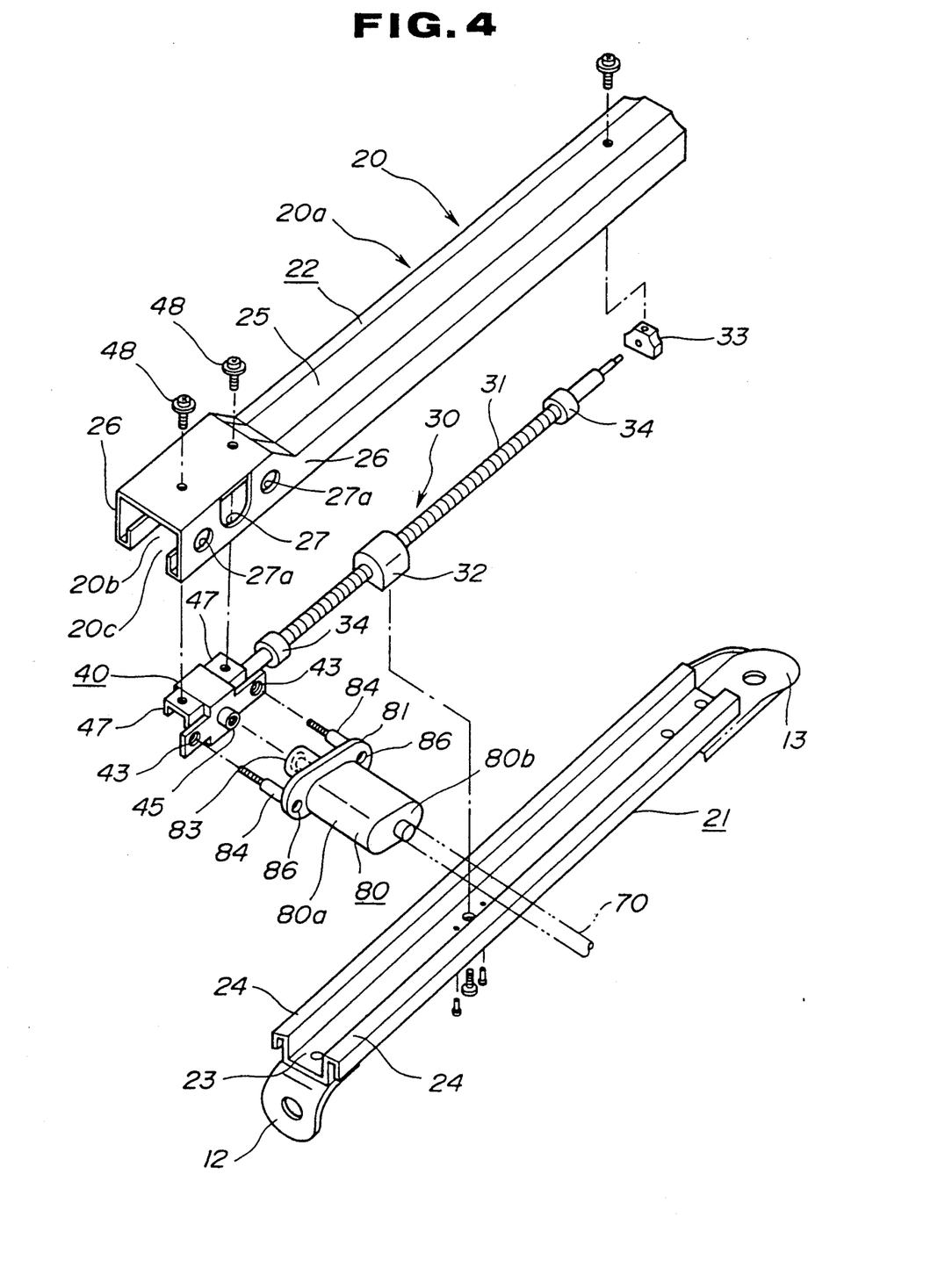
FIG. 4 is a general view illustrating disassembled parts of the powered seat slide device according to the invention.
Figure 6:
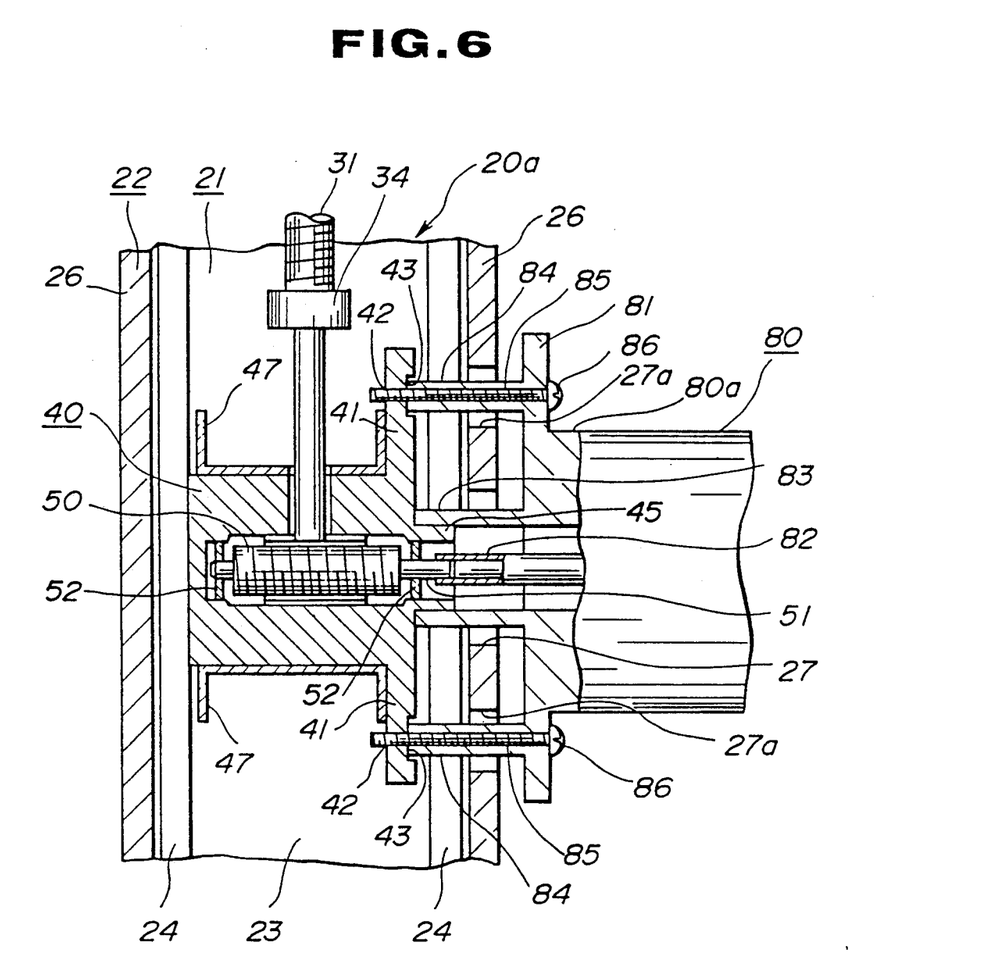
FIG. 6 is a holizontal cross-sectional view illustrating a mounting arrangement of the drive motor relative to the gear box rigidly mounted on the slidable guide rail employed in the powered seat slide device of the embodiment.

Referring now to FIGS. 3 and 4, a reversed hat shaped, lower stationary guide rail 21 includes a bottom wall section 23 and a pair of side wall sections 24 having a bended portion at the upper end thereof. On the other hand, the upper slidable guide rail 22 includes a ceiling wall section 25 and a pair of side wall sections 26 in such a manner as to slidably enclose the upper bended portion of the lower stationary guide rail 21. With the above noted rail arrangement, an aperture 20b is defined between the lower and upper rails 21 and 22. As shown in FIG. 3, a driving mechanism 30 is provided in the aperture 20b, so as to provide a relative sliding movement of the upper guide rail 22 relative to the lower guide rail 21. The driving mechanism 30 for the guide rail is comprised of a screw-threaded shaft 31 extending in a longitudinal direction of the guide rail and a nut member 32 engaged with the screw-threaded shaft 31. As seen in FIG. 4, the nut member 32 is fixed onto the bottom wall section 23 of the lower stationary guide rail 21 by means of bolts in such a manner as to prevent both rotational movement and sliding movement of the nut member 32 in respect to the lower guide rail 21. As shown in FIGS. 3 and 4, the driving mechanism 30 includes a gear box 40 accommodated in a chamber 20c defined in a slightly raised front end of the ceiling wall section 25 of the upper guide rail 22, a worm 50 operably accommodated in a lateral bore 44 defined in the gear box 40, and a pair of bearing members 52 disposed at both ends of the lateral bore 44 in order to rotatably support an input shaft 51 of the worm 50. As best shown in FIG. 6, the gear box 40 is rigidly mounted on the ceiling wall section 25 of the upper guide rail 22 through a pair of brackets 47, such that the brackets 47 sandwich front and rear ends of the gear box 40. The brackets 47 are fixed onto the ceiling wall section 25 by means of fastening bolts 48. The gear box 40 serves as a reduction gear for transmitting torque created by a drive motor 80, such as an electrically powered drive motor, to the screw-threaded shaft 31, while reducing revolution of the output shaft 82 of the motor 80 and increasing the created torque. The driving mechanism 30 is driven by the motor 80.

Note that a cut-out 27 is formed at the inner side wall section 26 of one guide rail unit 20a so as to introduce thereinto a cylindrical hub section 83 formed integral with a main motor casing 80a of the motor 80, while avoiding the interference between the cylindrical hub section 83 and the side wall section 26 of the upper guide rail 22, and in addition a pair of openings 27a are formed at the inner side wall section 26 in such a manner as to sandwich the cut-out 27, so as to introduce thereinto a pair of cylindrical hollow legs 84 formed integral with a motor mounting flange 81, while avoiding the interference between the cylindrical hollow legs 84 and the side wall section 26. The hollow legs 84 are symmetrically arranged with each other in respect to the center axis of the motor output shaft 82 and extend in parallel with the axis of the shaft 82. The hollow section of each leg 84 exposes to an opening 85 bored in the flange 81 for introducing the male screw-threaded section of a bolt 86. The hub section 83 is provided for rotatably supporting the output shaft 82 of the motor 80 and coaxially arranged with the output shaft 82. The other axially extending section of the output shaft 82, which extends through the other end 80b of the motor 80 faced apart from the hub section 83, is directed to the gear box 40 attached to the other guide 7 rail unit 20a through a flexible wire 70.

In addition to the above, the powered seat slide device according to the invention includes a pair of motor mounting brackets 41 formed integral with the gear box 40 and extending along the side walls of the brackets 47 in a longitudinal direction of the guide rail. Each mounting bracket 41 has a counterbore 43 fitted to the free end of the cylindrical hollow leg 84 and a central female screw-threaded hole 42 formed in an essentially center of the counterbore 43.

As shown in FIG. 4, the rear end of the screw-threaded shaft 31 is rotatably supported on the ceiling wall section 25 of the upper guide rail 22 by means of a bearing member 33, while the front end of the screw-threaded shaft 31 is inserted through the bracket 47 into the gear box 40 and rigidly fitted into a center of a worm wheel 60 operably enclosed in the gear box 50. A pair of stoppers 34 are provided in the vicinity of front and rear ends of the screw-threaded shaft 31 so as to restrict frontward and rearward movements of the shaft 31 relative to the lower stationary guide rail 21.

Figure 5:
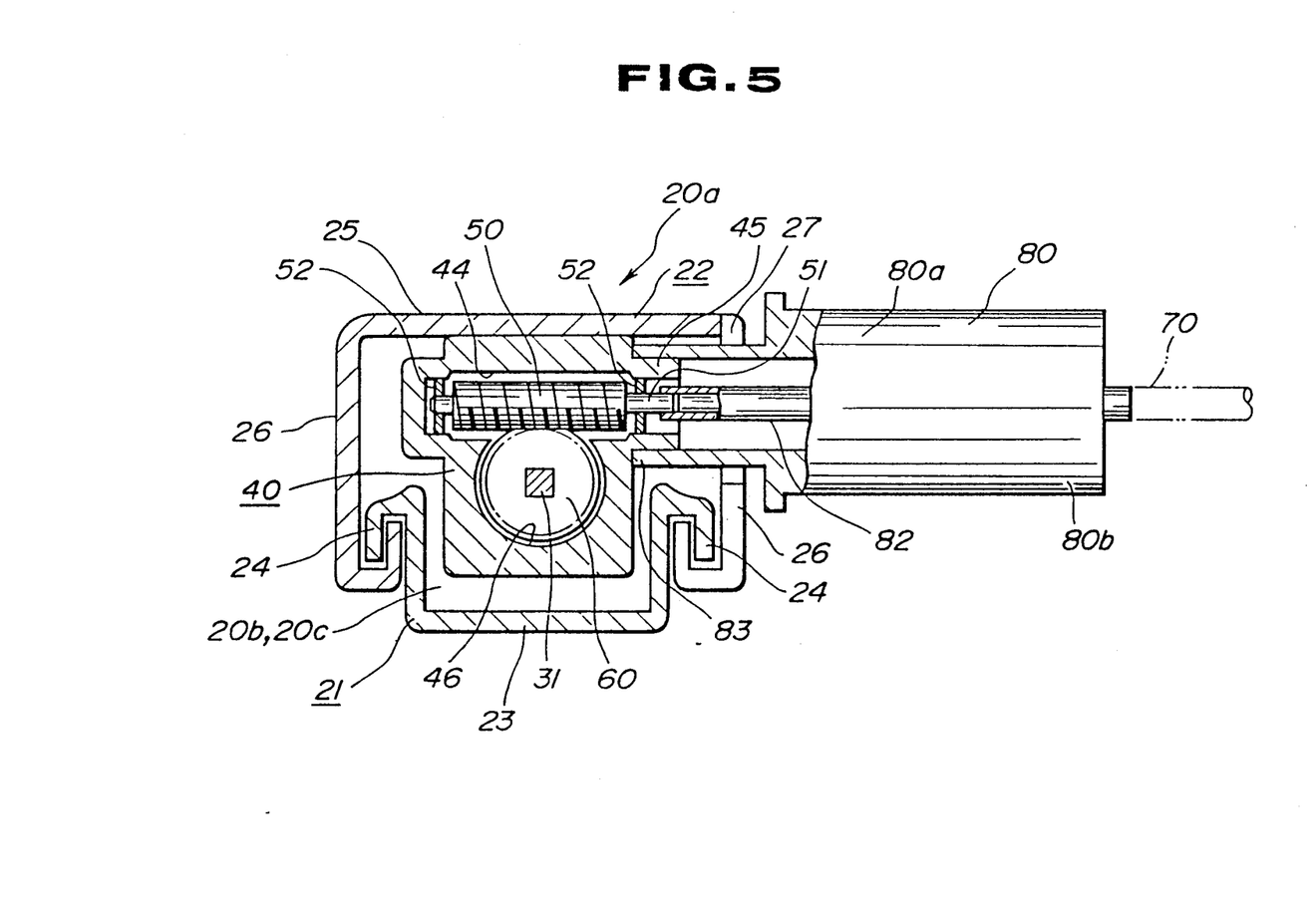
FIG. 5 is a vertical cross-sectional view illustrating a mounting arrangement of the drive motor relative to the slidable guide rail employed in the powered seat slide device of the embodiment.

Referring now to FIGS. 5 and 6, the worm wheel 60 is rotatably provided in an internal space 46 defined in a substantially center portion of the gear box 40 and meshed with the worm 50. Reference numeral 45 designates a laterally extending cylindrical hub section which is provided for receiving the bearing 52 rotatably supporting the input shaft 51 of the worm 50 and simultaneously fitting with the cylindrical hub section 83 of the motor 80. The hub section 45 is coaxially arranged with the axis of the worm shaft 51 in such a manner as to rotatably enclose the worm shaft.

With the above described arrangement of the powered seat slide device 20 according to the invention, when the disassembled parts shown in FIG. 4 are assembled to each other, the drive motor assembly is directly attached onto the gear box 40 having a relatively high rigidity, without introducing the interference between the cylindrical hub section 83 and the side wall section 26 of the upper guide rail 22 and the interference between the cylindrical hollow legs 84 and the side wall section 26. This reliably prevents resonance created between the drive motor and the driving mechanism.

The assembling order of the powered seat slide device 20 of the preferred embodiment will be hereinafter described in detail with reference to FIG. 3 or FIG. 4.

First of all, the gear box 40 employing the worm 50 and the worm wheel 60 is attached through the brackets 47 to the ceiling wall section 25 of the upper slidable guide rail 22, by means of bolts 48. Thereafter, the drive motor 80 is directly mounted through the motor mounting flange 81 on the gear box 40, such that the cylindrical hollow legs 84 are fitted into the counterbores 43 and simultaneously the outer periphery of the cylindrical hub section 45 of the gear box 40 is fitted into the inner periphery of the cylindrical hub section 83 of the motor 80 and in addition the cylindrical end of the output shaft 82 of the motor 80 is engaged with the input shaft 51 of the worm 50. In order to achieve a rigid connection between the motor mounting flange 81 and the motor mounting bracket 41, the bolts 86 are screwed into the female screw-threaded holes 42. In the preferred embodiment, the solid input shaft 51 of the worm is press-fitted into the output shaft 82 of the motor so as to assuringly provide a rigid connection between the two shafts 51 and 82. Furthermore, the motor mounting brackets 41 are formed integral with the gear box 40 in such a manner as to extend in the longitudinal direction of the upper guide rail 22 and in addition the frontwardly extending bracket 41 and the rearwardly extending bracket 41 are symmetrically arranged with each other in respect to the center axis of the worm shaft 51. Such a symmetrical arrangement is suitable to certainly receive reaction force created by rotation of the rotor of the motor 80. In this manner, the worm shaft 51 is rotated together with the drive motor shaft 82. As best seen in FIG. 6, during assembling, the drive motor assembly is not contact with the guide rail unit 20a at all, since the center cut-out 27 and the openings 27a function to avoid the previously noted interference between the guide rail and the motor assembly.

As will be appreciated from the above, the alignment matching between the input shaft 51 of the worm 50 and the output shaft 82 of the motor 80 is affected only by the machining accuracy of the gear box 40, but not by the machining accuracy of the upper guide rail 22.

As is generally known, the guide rail has a relatively low rigidity for the purpose of lightening of the guide rail unit, while the gear box has a higher rigidity than the guide rail for the purpose of smooth torque transmission. Assuming that offset load is applied to the seat by the vehicle occupant, the upper guide rail 22 is slightly deformed. Under this condition, if the motor assembly is attached to the upper slidable guide rail, there is a tendency for the two shafts 51 and 82 to be slightly misaligned to each other. At this time, when the power seat slide device is operated, noise occurs between the motor and the driving mechanism with a relatively great energy loss. Consequently, the motor is irregularly rotated, with fluctuations in the motor speed.

In the powered seat slide device according to the invention, the motor assembly is directly attached to the gear box. Since the gear box having a relatively high rigidity is usually suitable for a precise machining, the gear box can be easily manufactured with a high machining accuracy. Through direct connection between the motor assembly and the gear box, the output shaft of the motor can be easily and precisely aligned with the input shaft of the worm. As appreciated from the above, the durability of the device 20 of the embodiment is enhanced due to a precise alignment matching between the two shafts 51 and 82, and due to a reliable rigid connection between the motor assembly and the gear box having a high rigidity.

Referring now to FIG. 5, the output torque created by the motor 80 is smoothly transmitted from the output shaft 82 to the input shaft 51 of the worm 50. Thereafter, the rotation torque is transmitted to the screw-threaded shaft 31 through the worm 50 and the worm wheel 60 which are arranged perpendicularly to each other and meshed with each other. Since the nut member 32 is firmly fixed onto the lower stationary guide rail 21, the screw-threaded shaft 31 is moved rearwardly or frontwardly by means of the stationary nut member 32 in accordance with rotational movement of the shaft 31, with the result that the upper slidable guide rail 22 mounted onto the bottom of the seat is relatively moved in relation to the lower stationary guide rail 21. In this manner, the position of the seat relative to the floor panel of the vehicle body is reliably adjusted by means of the driving mechanism employed in the powered seat slide device 20.

In the preferred embodiment, although the input shaft 51 and the output shaft 82 are directly connected to each other, the two shafts may be connected through a rigid coupling so as to achieve rigid connection between the two shafts 51 and 82. It is preferable that the two shafts 51 and 82 are connected through a slider coupling, such as Oldham's coupling, since the Oldham's coupling permits two slightly misaligned shafts to be joined, while smoothly transmitting rotation torque from the output shaft of the motor to the input shaft of the worm.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. A powered seat slide device including at least one pair of guide rails for slidably supporting a seat such that the position of the seat relative to a floor is adjusted frontwardly and rearwardly, comprising:
   a driving mechanism having a driven connection with a drive motor, for causing a relative sliding movement of one of said guide rails to the other;
   said driving mechanism including a screw-threaded member rotatably supported on either one of said guide rails, a nut member engaged with said screw-threaded member and rigidly mounted on the other of said rails for rotation relative to said screw threaded member, and a gear box fixed to the one of said rails to serve as a reduction gear transmitting rotation torque from said motor to said screw-threaded member, while reducing a motor speed and increasing said torque created by said motor;
   a motor mounting member formed integral with said gear box via which said motor is directly connected to said gear box; and
   opening means provided in the side wall of the one of said rails, for avoiding interference between the motor assembly and the one of said guide rails, and for avoiding installation of the motor on the side wall of the one of said rails.

2. A powered seat slide device including at least one pair of guide rails for slidably supporting a seat such that the position of the seat relative to a floor is adjusted frontwardly and rearwardly, comprising:
   a driving mechanism having a driven connection with a drive motor, for causing a relative sliding movement of one of said guide rails to the other;
   said driving mechanism including a screw-threaded member rotatably supported on either of said guide rails, a nut member engaged with said screw-threaded member and rigidly mounted on the other of said rails for rotation relative to said screw threaded member, and a gear box fixed to the one of said rails to serve as a reduction gear transmitting rotation torque from said motor to said screw-threaded member, while reducing a motor speed and increasing said torque created by said motor;
   a motor mounting member formed integral with said gear box, for directly connecting said motor to said gear box; and
   an opening provided in the side wall of the one of said rails, for avoiding the interference between the motor assembly and the one of said guide rails, and for avoiding the installation of the motor on the side wall of the one of said rails;
   wherein said motor mounting member includes a pair of brackets formed integral with said gear box in such a manner as to extend in the longitudinal direction of the one of said rails, and said brackets are symmetrically arranged with each other in respect to an axis of an input shaft of said gear box.

3. A powered seat slide device including at least one pair of guide rails for slidably supporting a seat such that the position of the seat relative to a floor is adjusted frontward)y and rearwardly, comprising:
   a driving mechanism having a driven connection with a drive motor, for causing a relative sliding movement of one of said guide rails to the other;
   said driving mechanism including a screw-threaded member rotatably supported on either one of said guide rails, a nut member engaged with said screw-threaded member and rigidly mounted on the other of said rails for rotation relative to said screw-threaded member, and a gear box fixed to the one of said rails to serve as a reduction gear transmitting rotation torque from said motor to said screw-threaded member, while reducing a motor speed and increasing said torque created by said motor;

a motor mounting bracket formed integral with said gear box, for directly connecting said motor to said gear box;

a motor mounting flange formed integral with a motor casing of said motor, for rigidly mounting said motor on said motor mounting bracket, said motor mounting flange including at least two axially extending cylindrical hollow legs through which said motor is secured onto said motor mounting bracket, said cylindrical hollow legs are symmetrically arranged with each other in respect to the axis of the output shaft of said motor; and an opening provided in the side wall of the one of said rails, for avoiding the interference between the motor assembly and the one of said guide rails.

4. The device as set forth in claim 3, wherein said gear box has a higher rigidity than the one of said rails.

5. The device as set forth in claim 4, wherein said gear box includes a first cylindrical hub section coaxially arranged with the axis of the input shaft of said gear box, while rotatably enclosing the input shaft of said gear box, said motor mounting flange includes a second cylindrical hub section coaxially arranged with the axis of the output shaft of said motor, while rotatably enclosing the output shaft of said motor, and the outer periphery of said first cylindrical hub section is press-fitted into the inner periphery of said second cylindrical hub section, so as to assure a rigid connection between said motor assembly and said gear box.

6. A powered seat slide device including at least one pair of guide rails for slidably supporting a seat such that the position of the seat relative to a floor is adjusted frontwardly and rearwardly, comprising:

a driving mechanism having a driven connection with a drive motor, for causing a relative sliding movement of one so said guide rails to the other;

said driving mechanism including a screw-threaded member rotatably supported on either one of said guide rails, a nut member engaged with said screw-threaded member and rigidly mounted on the other of said rails for rotation relative to said screw threaded member, and a gear box fixed to the one of said rails to serve as a reduction gear transmitting rotation torque from said motor to said screw-threaded member, while reducing a motor speed and increasing said torque created by said motor; said driving mechanism operably arranged in an internal space defined in the one pair of guide rails;

a motor mounting member formed integral with said gear box via which said motor is directly connected to said gear box; and opening means provided in the side wall of the one of said rails, for providing the direct connection of the motor onto the gear box while avoiding interference between the motor and the one of said guide rails, and for introducing the output shaft of said motor on the side wall of the one of said rails.

7. A powered seat slide device including at least one pair of guide rails for slidably supporting a seat such hat the position of the seat relative to a floor is adjusted frontwardly and rearwardly, comprising:

a driving mechanism having a driven connection with a drive motor, for causing a relative sliding movement of one of said guide rails to the other;

said driving mechanism including a screw-threaded member rotatably supported on either one of said guide rails, a nut member engaged with said screw-threaded member and rigidly mounted on the other of said rails for rotation relative to said screw threaded member, and a gear box having a housing and being fixed to the one of said rails to serve as a reduction gear transmitting rotation torque from said motor to said screw-threaded member, while reducing a motor speed and increasing said torque created by said motor;

a motor mounting member formed integral with said gear box via which said motor is directly connected to said gear box; and means for permitting the direct connection of said gear box housing to said motor such that said sidewall of the one of said rails is prevented from supporting said motor.

* * * * *